(12) United States Patent
De Lega

(10) Patent No.: US 7,023,562 B2
(45) Date of Patent: Apr. 4, 2006

(54) CHARACTERIZATION OF PERIOD VARIATIONS IN DIFFRACTION GRATINGS

(75) Inventor: Xavier Colonna De Lega, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 122 days.

(21) Appl. No.: 10/238,547

(22) Filed: Sep. 10, 2002

(65) Prior Publication Data

US 2003/0128370 A1 Jul. 10, 2003

Related U.S. Application Data

(60) Provisional application No. 60/318,444, filed on Sep. 10, 2001.

(51) Int. Cl.
*G01B 9/02* (2006.01)

(52) U.S. Cl. .......................... 356/521; 385/37

(58) Field of Classification Search ................. 385/37, 385/31; 356/488, 494, 512, 521
See application file for complete search history.

(56) References Cited

U.S. PATENT DOCUMENTS

| 5,973,786 | A  | * | 10/1999 | Yoon et al. ................. 356/521 |
| 6,304,332 | B1 | * | 10/2001 | Flynn et al. ................. 356/625 |
| 6,344,898 | B1 | * | 2/2002  | Gemma et al. ............. 356/513 |
| 6,781,701 | B1 | * | 8/2004  | Sweetser et al. ............. 356/521 |

OTHER PUBLICATIONS

Butler et al., "High perfection chirped grating..," J. Vac. Sci. Technol. B, 17(6):3217-3221, 1999.
Ardito et al., "Fabrication of Phase Masks for Fiber . . . ," Microelectronic Engineering, 46:251-254, 1999.
Barnier et al., "Sub-nanometer metrology of chipred . . . ," Optics Communications, 170:175-179, 1999.
Christopher Palmer, "Diffraction Grating Handbook, Fourth Edition," Published by the Richardson Grating Laboratory, 705 St. Paul Street, Rochester, New York 14605, 2000, www.gratinglab.com.
Loewen et al., "Diffraction gratings and applications," Chapter 11, Marcel Dekker Inc. Publisher, 1999, ISBN 0-8247-9923-2.

* cited by examiner

*Primary Examiner*—Sung Pak
(74) *Attorney, Agent, or Firm*—Fish & Richardson, P.C.

(57) ABSTRACT

Methods and systems for interferometrically characterizing diffractive elements are disclosed.

31 Claims, 8 Drawing Sheets

CHARACTERIZATION OF PERIOD VARIATIONS IN DIFFRACTION GRATINGS

CROSS-REFERENCE TO RELATED APPLICATIONS

This application claims priority to Provisional Patent Application 60/318,444, entitled "CHARACTERIZATION OF PERIOD VARIATIONS IN DIFFRACTION GRATINGS," by Xavier Colonna de Lega, filed Sep. 10, 2001.

BACKGROUND

Diffraction gratings are periodic structures manufactured on transparent or reflective substrates. Their basic property consists in generating angularly separated copies of any incoming light beam. Because this phenomenon is wavelength-dependent light beams of different optical frequencies are also angularly separated. A major application of diffraction gratings is in spectroscopy where the grating acts as the dispersive element that spatially separates different wavelengths. Gratings are also used as the stabilizing feedback element in certain types of laser diode modules, as beam splitters, as fan generators used for machine vision applications, etc.

The recent expansion of fiber optics based telecommunication has created a large demand for devices called Fiber Bragg Gratings ("FBG's"). These devices are used, for example, to separate telecom frequency bands or compensate for optical dispersion in long-haul fiber networks. FBG's are also used as embedded strain sensors for civil engineering or geophysical studies and oil, gas or mining exploitation. FBG's are gratings in the sense that the refractive index of the optical waveguide (typically a fiber) is modulated periodically over some distance. The refractive index modulation is typically produced by exposing the waveguide with a high-intensity UV modulation pattern from the side. This modulation pattern, in turn, is typically created using a phase mask, which is simply a dedicated diffraction grating that produces a modulated UV intensity pattern when illuminated with coherent light of appropriate wavelength.

The current band spacing in fiber optics telecommunication dictates that FBG used as channel add/drop devices have a flat 50-Ghz bandwidth with steep flanks and essentially no side lobes. Moreover, they should not introduce unwanted or uncontrolled optical dispersion. However, imperfections in phase mask periodicity can introduce side lobes and dispersion in FBG's. It is thus desirable to be able to characterize these phase masks to identify unwanted characteristics and/or defects prior to writing FBG's.

A parameter of particular interest in phase masks is the chirp, or grating period variation as a function of position along the mask. For example, linear chirp corresponds to a linearly varying period. The required accuracy of grating period in chirped FBG's can be extremely demanding. For example, some FBG manufacturers require this parameter to be below 5 picometers per centimeter along the grating length. This corresponds to a period stability of 10 ppm per cm. Such demanding specifications means that grating manufacturers should measure their components with a resolution on the order of a few pm/cm.

Understandably, such demanding specifications mean that phase masks should be precisely manufactured. A typical approach to qualifying a Bragg grating phase mask is a functional test: writing FBG's in fibers using the phase mask and measuring the properties of the written FBG. However, this approach can be time consuming and implies the simultaneous control of many process parameters that do not relate directly to the quality of the phase mask.

SUMMARY

Direct techniques for characterizing phase masks are disclosed. More generally, these techniques can be used to characterize other diffractive elements as well, such as planar diffraction gratings and holographic elements.

In general, in a first aspect, the invention features a method for interferometrically characterizing a diffractive element. The method includes producing a first phase profile of the diffractive element based on a zeroth order wavefront diffracted from the diffractive element, producing a second phase profile of the diffractive element based on a non-zero order wavefront diffracted from the diffractive element, and characterizing the diffractive element based on the first and second phase profiles.

Implementations of the method can include one or more of the following features.

Producing the first phase profile can include acquiring a first interference pattern derived from the zeroth order wavefront. The first interference pattern can be derived by interfering a reference wavefront with the zeroth order wavefront. Similarly, producing the second phase profile can include acquiring a second interference pattern derived from the non-zero order wavefront. The second interference pattern can be derived by interfering the reference wavefront with the non-zero order wavefront. The first phase profile can be produced based on an interference phase determined for each of a plurality of locations in the first interference pattern. Likewise, the second phase profile can be produced based on an interference phase determined for each of a plurality of locations in the second interference pattern. In some embodiments, producing the first phase profile further includes acquiring a first set of interference patterns including the first interference pattern derived from the zeroth order wavefront, and producing the second phase profile further includes acquiring a second set of interference patterns including the second interference pattern derived from the non-zero order wavefront. In these embodiments, the first phase profile can be produced based on additional interference phases determined from the first set of interference patterns for each of the plurality of locations in the first interference pattern and the second phase profile can be produced based on additional interference phases determined from the second set of interference patterns for each of the plurality of locations in the second interference pattern.

In embodiments where the first and second phase profiles are produced from first and second sets of interference patterns, respectively, for one or both sets of interference patterns the interference phase at each location can be shifted with respect to an interference phase at that location in other interference patterns in that set.

The method can further include illuminating the diffractive element with measurement wavefronts to form diffracted wavefronts including the zeroth order wavefront and the non-zero order wavefront. A wavelength of the measurement wavefront can be varied to shift the interference phase at each location. Alternatively, or additionally, the method can also include varying the optical path length between the reference wavefront and diffracted wavefronts to shift the interference phase at each location.

The first and second interference patterns can be produced using a Fizeau interferometer, a Michelson interferometer or a Mach-Zehnder interferometer. Furthermore, the diffractive element can be a transmissive diffractive element or a reflective diffractive element. In some embodiments, the diffractive element is a phase mask for writing fiber Bragg gratings.

The non-zero order wavefront can be a first order wavefront diffracted from the diffractive element. Alternatively, the non-zero order wavefront can be a higher order wavefront than the first order wavefront.

The diffractive element can be positioned relative to illumination optics so that a direction defined by the non-zero order wavefront is minimally displaced from a direction defined by the zeroth order wavefront (e.g., the diffractive element can be in a minimum deviation position). In embodiments where the diffractive element is a reflective diffractive element, the diffractive element can be oriented in a Littrow configuration with respect to a measurement wavefront.

The interference patterns can be acquired using a single pass system or a double pass system.

The method can also include reducing distortion of the non-zero order wavefront due to the diffractive element by nulling the non-zero order wavefront. Nulling the non-zero order wavefront can include diffracting the non-zero order wavefront from a diffractive nulling element (e.g., a master for the diffractive element). Alternatively, or additionally, nulling the non-zero order wavefront can include reflecting the non-zero order wavefront from a non-planar mirror.

The diffractive element can be characterized by determining variations in a grating period of the diffractive element from the first and second phase maps. Determining variations in the grating period can include removing distortions common to the first and second phase maps from the second phase map. Such distortions can be related to inhomogeneities of a surface of the diffractive element and/or to inhomogeneities in the composition of the diffractive element. The diffractive element can be characterized by determining a fit of the wavefront distortion profile to an analytical model. In such embodiments, the diffractive element can be characterized by determining one or more grating parameters (e.g., linear chirp or quadratic chirp) from the fit of the wavefront distortion profile to the analytical model.

In a further aspect, the invention features a method of making a fiber Bragg grating, including characterizing a phase mask using the method described in the first-described aspect of the invention, and illuminating an optical fiber through the phase mask to form the fiber Bragg grating.

In another aspect, the invention features a system, including an interferometer, wherein the interferometer includes a reference surface and a mount for adjustably supporting a diffractive optical element. The interferometer is configured to be adjustably oriented in a first configuration and a second configuration, wherein in the first configuration a reference wavefront reflected from the reference surface and a zeroth order wavefront diffracted from the diffractive element interfere to form a first interference pattern. In the second configuration, the reference wavefront and a non-zero order wavefront diffracted from the diffractive element interfere to form a second interference pattern. The system also includes a detector positioned relative to the interferometer to detect the first and second interference patterns, and a controller. During operation, in the first configuration, the controller produces a first phase profile of the diffractive element based on the zeroth order wavefront, and during operation in the second configuration the controller produces a second phase profile of the diffractive element based on a non-zero order wavefront. The controller further characterizes the diffractive element based on the first and second phase profiles.

Embodiments of the system can be adapted to perform the methods or include any of the features described in reference to the above-described aspects of the invention. Alternatively, or additionally, embodiments of the system can include one or more of the following features.

The interferometer can also include a reference element for directing illumination to the diffractive element. The reference element can be adjustably oriented so that in the first configuration, the illumination produces the zeroth order wavefront and in the second configuration the illumination produces the non-zero order wavefront. In some embodiments, the reference element is positioned to reflect illumination diffracted from the diffractive element back towards the diffractive element. The reference element can be a mirror (e.g., a flat or curved mirror) or a second diffractive element (e.g., a master diffractive element to the diffractive element). The reference element can be a nulling element.

Embodiments of the invention can include one or more of the following advantages.

Embodiments of the invention can be used to characterize grating period variations down to the pm/cm level by leveraging the high-resolution of phase measuring interferometry. High-accuracy can be attained by eliminating additional wavefront distortion sources (e.g., substrate inhomogeneity and flatness errors). Parameters, such as linear and quadratic chirp, can be readily measured. Methods use a two-step measurement approach, compatible with existing interferometer designs. Strongly chirped gratings can be measured, for example, by adding a nulling optical element. High spatial density sampling techniques can provide detailed maps of grating structures. This allows mapping a given grating's period variations and applying the appropriate correction in the case of scanning fiber Bragg grating writers. The high-spatial density sampling can allow sub regions of gratings to be processed and allows a user to measure the variation of critical parameters such as linear or quadratic chirp across the full grating aperture.

Embodiments of the invention can enable a user to characterize a component itself rather than perform functional tests in complex instruments relying on gratings. Moreover, there is the possibility to characterize a wide range of gratings with a single interferometer, regardless of the actual use wavelength. For example, UV phase masks can be characterized using inexpensive visible-light lasers.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control. In addition, the apparatus, methods, and examples are illustrative only and not intended to be limiting.

Other features and advantages of the invention will be apparent from the following detailed description, and from the claims.

DESCRIPTION OF DRAWINGS

Like reference symbols in the various drawings indicate like elements.

DETAILED DESCRIPTION

The invention features methods and systems for interferometrically characterizing diffractive elements, such as phase masks for writing fiber Bragg gratings ("FBG's").

Features smaller than a thousandth of the wavelength of light can be measured in modem interferometers. Accordingly, interferometry provides sufficiently high resolution to characterize and qualify FBG phase masks to meet the particularly demanding performance specifications necessary to write FBG's. In practice, period variations of a phase mask result in detectable distortions of a diffracted wavefront. Hence, a measurement of the wavefront shape can be used to determine the actual period variations. There are, however, other sources of wavefront distortion, such as grating substrate flatness and homogeneity defects. The effects of grating substrate flatness defects and/or homogeneity errors can be fully separated from the effects of the grating period variations when the grating is measured according to a well-chosen geometry. Careful numerical analysis of the wavefront shape then allows determining the actual period variations. Accordingly, interferometry systems for making such measurements are described.

Figure 1:
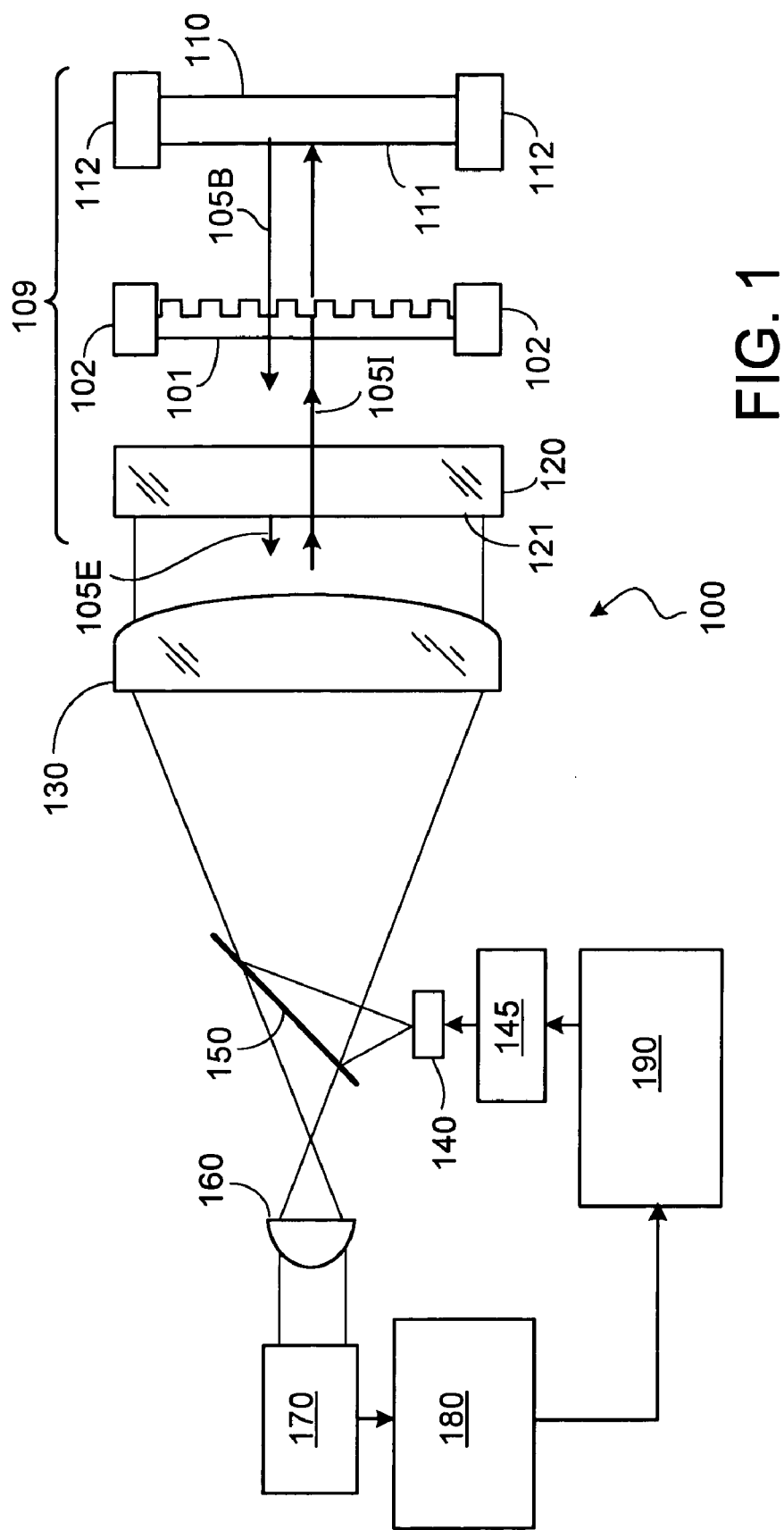
FIG. 1 is a schematic diagram of an interferometry system, including a Fizeau interferometer configured to characterize a transmission grating.

A schematic diagram of an interferometry system 100 is shown in FIG. 1. System 100 includes a Fizeau interferometer 109, and is adapted to measure the optical interference between a reference wavefront reflected from a reference surface 121 of a transmission flat 120 and a wavefront diffracted by a transmission grating 101 and reflected by a surface 111 of a second reference mirror 110. System 100 includes a mount 102 for positioning transmission grating 101 relative to reference mirror 110 and transmission flat 120. Mount 102 allows rotation of diffractive element 101 about an axis parallel and coplanar to the grating lines. Transmission grating 101 is mounted with gratings lines facing away from incident wavefronts in beam 105I. Reference mirror 110 is also positioned on an adjustable tip/tilt mount 112, which allows a user to position reference mirror 110 appropriately relative to the diffracted wavefront. System 100 also includes a tunable light source 140 (e.g., a laser diode), a driver 145 connected to light source 140 for adjusting the optical frequency of its output, a beam splitter 150, a collimating optic 130, an imaging optic 160, a CCD camera 170, a computer 190, and a frame grabber 180 for storing images detected by camera 170. In some embodiments, a single device can perform both control and measurement functions (e.g., frame grabber 180 may be incorporated in computer 190).

During operation, controller 190 causes driver 145 to control the optical frequency of light emitted by light source 140 and causes frame grabber 180 to store an image of the optical interference pattern detected by CCD camera 170 for each of the specified optical frequencies. Driver 145 tunes the optical frequency $\nu$ of light source 140, through a frequency range $\Delta\nu$ about a nominal optical frequency of $\nu_0$. The frequency variation phase shifts the optical interference image detected at CCD camera 170. Frame grabber 180 sends each of the images to controller 190, which analyzes them using a phase shifting algorithm. In some embodiments, driver 145 linearly modulates the optical frequency of the light source 140 as the series of interference images are being recorded. Alternatively, in other embodiments, the driver can modulate the optical frequency in discrete steps or according to other functions. Examples of phase shifting algorithms are described in U.S. Pat. No. 6,359,692, entitled "METHOD AND SYSTEM FOR PROFILING OBJECTS HAVING MULTIPLE REFLECTIVE SURFACES USING WAVELENGTH-TUNING PHASE-SHIFTING INTERFEROMETRY," by Peter de Groot, issued Mar. 19, 2002 and in chapter 14 of "Optical Shop Testing," edited by Daniel Malacara and published by Wiley-Interscience in 1992 ($2^{nd}$ Edition).

Light source 140 directs light having an optical frequency $\nu$ to beam splitter 150, which then directs the light to collimating lens 130 to collimate the light into a plane field. This light forms an input wavefront propagating in a direction indicated by beam 105I (wavefront directions are indicated by beams in the figures). Optionally, a second beamsplitter (not shown) directs a portion of the light to an optical frequency monitor. Surface 121 reflects a portion of the input wavefront to form the reference wavefront. The reference wavefront exits interferometer 109 propagating as beam 105E. A portion of the input wavefront is transmitted by transmission flat 120, and forms a measurement wavefront that is incident on transmission grating 101. Transmission grating 101 diffracts a portion of the measurement wavefront. In FIG. 1, only zeroth order wavefront is shown, although, in general, the measurement wavefront can be diffracted into multiple diffractive orders. Surface 111 of reference mirror 110 reflects the zeroth order wavefront back through diffractive element 101 as beam 105B. The zeroth order wavefront exits interferometer 109 overlapping the reference wavefront in beam 105E. Lenses 130 and 160 then image the exiting wavefronts onto CCD camera 170 where they form the optical interference pattern.

Transmission grating 101 is characterized using a two-measurement sequence. Before either of the measurements are made, the user observes a first order wavefront diffracted from transmission grating 101 on a screen located on the opposite side of transmission grating 101 from transmission flat 120. The user rotates mount 102 to minimize deviation of the first order wavefront from the zeroth order wavefront (i.e., wavefront transmitted directly through grating 101). In other words, the user brings the spot on the screen as close as possible to the optical axis of lenses 160 and 130. This is the minimum deviation position. This position is easily found in practice by pivoting the grating about an axis parallel to its grooves and observing when the deviation in the chosen order is minimum.

Figure 2:
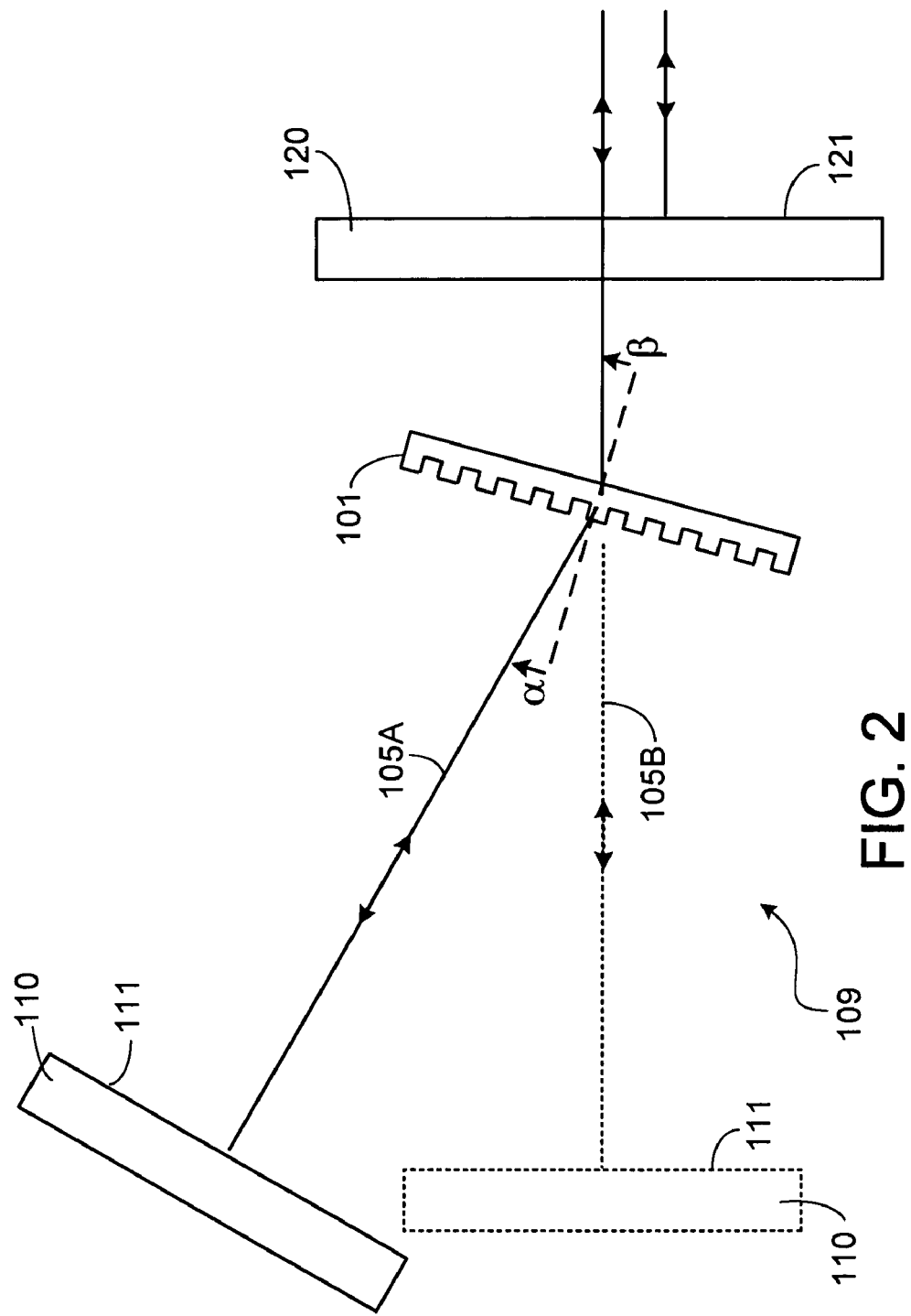
FIG. 2 is a schematic diagram of the Fizeau interferometer shown in FIG. 1.

Referring to FIG. 2, the user adjusts reference mirror 110 to reflect the first order wavefront back upon itself, propagating back and forth as beam 105A. In this configuration, the reflected first order wavefront is diffracted a second time from transmission grating 101 and is transmitted by transmission flat 120, emerging parallel to and substantially overlapping reference wavefront in beam 105E. The user can optimize alignment of the wavefronts by performing fine tip/tilt adjustment of reference mirror 110 until the number of fringes in the interference pattern formed by the overlapping wavefronts is minimized. Once transmission grating 101 and reference mirror 110 are properly aligned, the interference pattern formed by the overlapping wavefronts, which is imaged to CCD camera 170 by lenses 130 and 160, is profiled by phase-shifting the interference pattern and extracting an interference phase for each pixel in CCD camera 170, providing a first order phase map.

After acquiring the first order phase map, reference mirror 110 is adjusted to reflect the zeroth order wavefront back toward lenses 130 and 160. The zeroth order wavefront propagates back and forth as beam 105B. In this configuration, an interference pattern formed by reference wavefront and the zeroth order wavefront are imaged by lenses 130 and 160 onto CCD camera 170. This interference pattern is also profiled using a phase-shifting technique, thereby providing a zeroth order phase map.

Since the diffracting surface faces away from the illumination source, the optical path through grating 101 is common for both configurations up to the point where the wavefronts diffract. Hence, the zeroth order phase map contains all the wavefront distortions induced by the grating substrate recorded in the first order phase map. Accordingly, the difference between the phase maps, termed the wavefront distortion profile, yields the distortion generated by variations in the grating periods alone. Because the grating's position is fixed relative to the CCD camera for both measurements, numerical analysis of the phase maps can be done in the same co-ordinate system for both configurations, simplifying the calculation of their difference.

Interferometer 109 is well suited for the measurement of constant-period gratings. In this case, the wavefront diffracts from the grating, bounces back from the mirror and strikes the grating at a position virtually identical to the position where the wavefront first diffracted. In this "double-pass" measurement, each point on the detector corresponds to a single location on the grating surface. Interferometer 109 can also be used to characterize gratings with varying periods (e.g., chirped gratings) and other diffractive elements (e.g., holographic elements) provided divergence of wavefronts diffracted from the grating/diffractive element is minimal and distortion of the wavefront due to the second refraction is minimal and/or predictable. In this regime, corresponding to small wavefront distortions, the hypothesis of double-pass still holds and the mapping of the diffracting surface onto the detector is straightforward. Additional embodiments adapted to measure strongly chirped gratings and diffractive elements that have strongly divergent first order diffracted wavefronts are described below.

The present embodiment uses wavelength tuning and a suitable phase shifting algorithm to determine phase maps from acquired sets of interference patterns. While phase shifting techniques such as this provide highly accurate measurements of relative interference phase at difference locations of a series of phase-shifted interference patterns, other methods can also be used to determine the phase maps. For example, other phase-shifting techniques can be used, such as mechanical phase shifting. In mechanical phase shifting, a component (e.g., transmission flat 120) in the interferometer is mechanically displaced (using e.g., a piezoelectric transducer). Mechanical phase shifting varies an optical path difference between the overlapping wavefronts, which shifts the phase of the interference pattern at the detector. Alternatively, or additionally, a phase map can be determined from a single interference pattern image provided there is sufficient contrast between the fringes in the image.

The optical interference patterns detected by CCD camera 170 can also include contributions from higher order reflections within cavity 109. In general, the effect of higher order reflections on the integrity of a measurement can be reduced in a number of ways. For example, antireflection coatings can be provided on non-critical surfaces, such as the second surface of transmission flat 120. Alternatively, or additionally, the effect of higher order reflections can be reduced during data analysis. For example, Fourier transform phase shifting interferometry (FTPSI) can be used. Examples of FTPSI are described in U.S. patent application Ser. No. 09/919,511, entitled "FREQUENCY TRANSFORM PHASE SHIFTING INTERFEROMETRY," by Leslie L. Deck, filed Jul. 31, 2001.

Figure 3A:
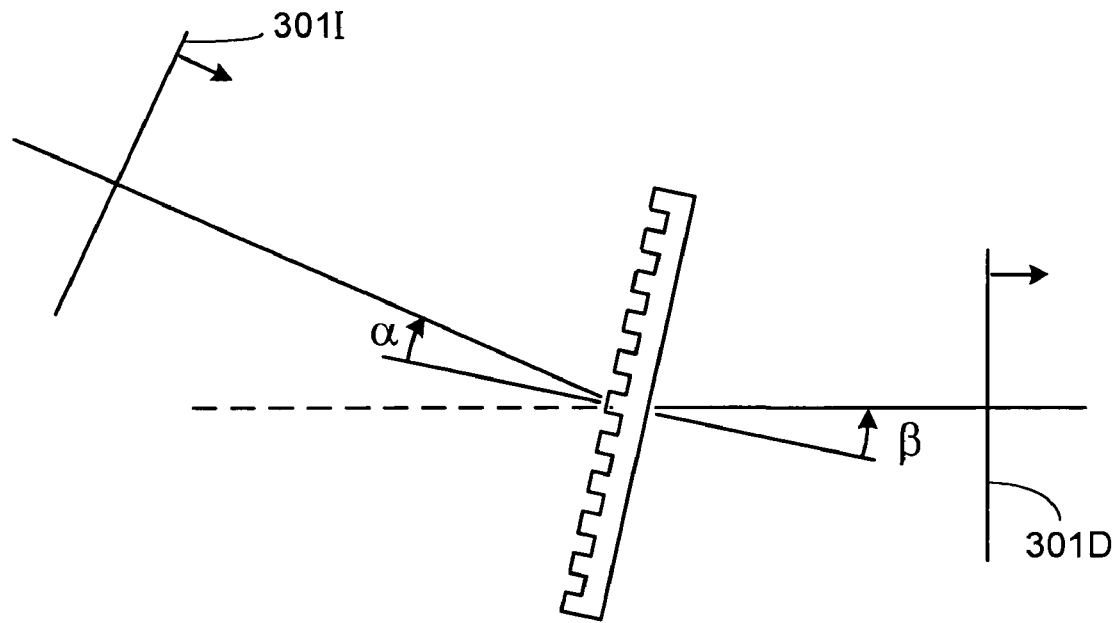
FIG. 3(a) and FIG. 3(b) are schematic diagrams showing a wavefront diffracted from a transmission grating and reflection grating, respectively.
Figure 3B:
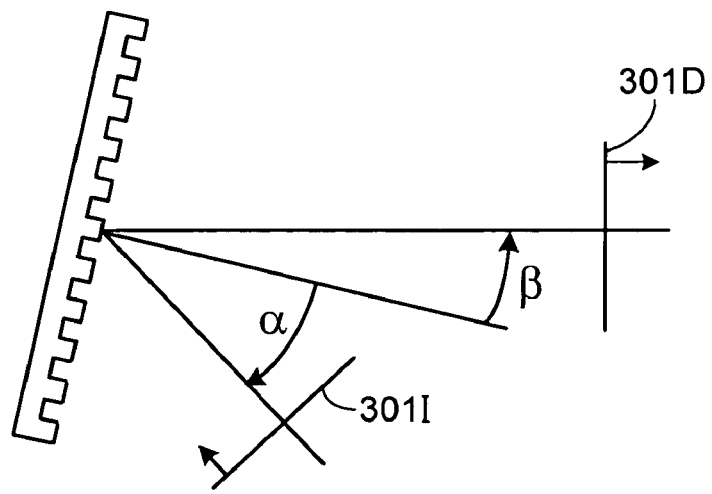

In order to understand how the two phase maps enable characterization of transmission grating 101, we consider the relationship between incident and diffracted wavefront more generally. Moreover, while the present embodiment explicitly deals with characterizing a transmission grating, the general principles disclosed herein can be extended to reflection gratings as well. FIG. 3(a) and FIG. 3(b) show wavefronts diffracted from a transmission and reflection grating, respectively. In both cases, an incident wavefront 301I strikes the grating with an angle of incidence, $\alpha$, measured from the grating normal. Positive angles in these figures correspond to counter-clockwise rotations. The grating equation can be used to calculate the diffraction angle, $\beta$, of an $m^{th}$ order diffracted wavefront 301D:

$$n' \cdot \sin\beta = n \cdot \sin\alpha + \frac{m\lambda}{p}. \quad (1)$$

Here $\lambda$ is the wavelength of light, p is nominal grating period and n and n' are the refractive indices of the media where the incident, respectively diffracted, ray propagate. In the case of a reflection grating, we have additionally: n'=−n.

Let us first consider the reflection grating and calculate the derivative of Eq. (1). We find:

$$-\cos\beta \cdot d\beta = \cos\alpha \cdot d\alpha \quad (2)$$

It follows that when $\alpha$ and $\beta$ are equal in magnitude, a small variation of the angle of incidence results in a variation of the diffraction angle of the same magnitude but opposite sign. This behavior is the same as reflection of a wavefront from a simple mirror. This behavior is observed when:

$$\begin{cases} \beta = -\alpha \Leftrightarrow m = 0 \\ \beta = \alpha \Leftrightarrow \sin\beta = -\frac{m\lambda}{2p} \end{cases} \quad (3)$$

We assume here that n=1, since most of our measurements take place in air. When the media adjacent the grating is something other than air, equation 3 should be suitably adjusted to account for the medium refractive index. The case where m=0 (i.e., zeroth order diffraction) corresponds to the direct reflection of the wavefront from the grating, as if it was bouncing off a mirror. In this case, the variations in the reflection (diffraction) angle are due to the flatness of the substrate. Hence, a phase map of the wavefront diffracted in the zeroth order yields a map of the wavefront distortion induced by surface flatness errors. A second measurement performed for m≠0 and β=α then yields a phase map where the wavefront is affected similarly by the local surface slope variations, but also by the grating period variations. By subtracting the first phase map from the second we can thus separate the wavefront distortions induced by the substrate flatness errors from the distortions solely induced by the period variations. The cancellation of the wavefront distortion induced by the substrate flatness occurs when the two measurements are performed according to Eq.(3). Note that the condition β=α corresponds to the so-called Littrow configuration, wherein a diffracted wavefront is reflected from a grating back along the direction of incidence. This configuration can be useful for reasons apparent from embodiments described herein.

The case of the transmission grating is very similar and we find that the effect of the grating surface flatness errors is the same in the following cases:

$$\begin{cases} \beta = \alpha \Leftrightarrow m = 0 \\ \beta = -\alpha \Leftrightarrow \sin\beta = \frac{m\lambda}{2p} \end{cases} \quad (4)$$

Note that the case where β=−α corresponds to the so-called "minimum deviation" condition for the diffraction order m. In this case, the angle between incident and diffracted ray is minimized for that particular order. A small rotation of the grating about the grating lines does not significantly change the direction of the diffracted wavefront at the minimum deviation position. In other words, local grating normal variations (flatness imperfections) do not significantly affect the angle of diffraction. Hence, the minimum deviation condition ensures that the contribution of grating surface variations to the first order diffracted wavefront is effectively decoupled from the contribution of grating period variations. Thus, the wavefront distortion profile can be determined by subtracting the grating surface variation, as determined from the zeroth order phase map, from the first order phase map. Accordingly, measuring the phase profiles with the grating in the minimum deviation condition simplifies grating characterization, which could otherwise require an additional measurement of the grating surface profile to decouple the contribution of surface profile variations from the first order wavefront to determine the wavefront distortion profile. Also, knowledge of the nominal pitch and that the grating is at minimum deviation allow calculation of the angle of incidence α, which can be used to calculate grating parameters, such as chirp. Note that because the minimum deviation condition is at a point of inflection for grating alignment, coupling between the surface variation contribution and grating period variation contribution remains weak for slight misalignment from the minimum deviation condition. Hence, it is usually sufficient to determine this position "by eye" for the purposes of assuming the minimum deviation condition for analysis. Although the present embodiment utilizes the minimum deviation condition, in other implementations the diffractive element can be positioned in other orientations. When the diffractive element is not oriented to satisfy the minimum deviation condition, additional analysis of the phase maps may be necessary to determine grating parameters.

By following the same scheme as for the reflection grating we can thus substantially eliminate one error source. However, the wavefront can also be distorted while propagating through the grating substrate (due to, e.g., inhomogeneity in the grating material) and by refraction through the second surface of the substrate (e.g., flatness error of this interface). It follows that there are at least three sources of wavefront distortion not related to the grating period: the two substrate interfaces and material homogeneity. By appropriately selecting the geometry of the interferometer we measure these effects simultaneously while performing the wavefront measurement in the zeroth order diffracted wavefront.

Once the two wavefront measurements have been performed (m=0 and m≠0 with β=±α, the sign depending on the type of grating) we obtain two phase maps representing the wavefront topography at sampling points defined by the pixels of the camera used to image the grating through the interferometer. In the present embodiment, the m≠0 order is the first order, however, higher order diffracted wavefronts can also be used (i.e., m>1) to provide information about variations in the grating period. The difference between the two maps is the wavefront distortion profile, which is a phase map of the wavefront distortion induced by grating period variations.

Chirped gratings are designed to have variations in grating period, and are therefore natural candidates for characterization using the described technique. For example, if we call x the lateral position along an axis perpendicular to the grating groove and to the optical axis of the interferometer, the wavefront map distortion induced by linear and quadratic chirp can be mathematically expressed as follows:

$$W(x) = -\frac{\tan\beta_0}{\cos\beta_0}\frac{l_{chirp}}{p_0}x^2 + \frac{2}{3}\frac{\tan\beta_0}{\cos^4\beta_0 \cdot p_0^2}(l_{chirp}^2 - q_{chirp} \cdot p_0 \cdot \cos^2\beta_0)x^3 \quad (5)$$

where $\beta_0$, $p_0$ are the diffraction angle and the grating period at the center of the coordinate system, respectively, and $l_{chirp}$ and $q_{chirp}$ are linear and quadratic chirp parameters.

In practice, we calculate a least-square fit of the data to the analytical form of wavefront distortion given in equation (5). This model includes adjustable parameters related to the features of interest on the grating, e.g., the linear or quadratic chirp. The least-square fit procedure provides values for these parameters that optimally match the model to the data. For example, we can calculate a least-square fit of the data using the polynomial function:

$$W'(x, y) = \sum_{\substack{0 \leq i+j \leq 3 \\ 0 \leq i, 0 \leq j}} a_{i,j} x^i y^j \quad (6)$$

where y is the lateral position measured in the plane of the camera, perpendicular to the x-direction. The result of the fit is a set of coefficients $a_{i,j}$. By matching coefficients of $x^2$ and $x^3$ in equation 5 with corresponding empirically determined coefficients in equation 6 we find that the linear and quadratic chirp can be calculated as:

$$l_{chirp} = -\frac{p_0 \cos\beta_0}{\tan\beta_0} a_{2,0} \quad (7)$$

-continued $$q_{chirp} = \frac{p_0}{\tan^2\beta_0}a_{2,0}^2 - \frac{3\cos^2\beta_0 \cdot p_0}{2\tan\beta_0}a_{3,0}$$

Accordingly, grating parameters, such as linear and quadratic chirp, can be quantitatively determined from interferometric measurements of a zeroth order and first order wavefronts diffracted from a chirped grating.

Figure 4:
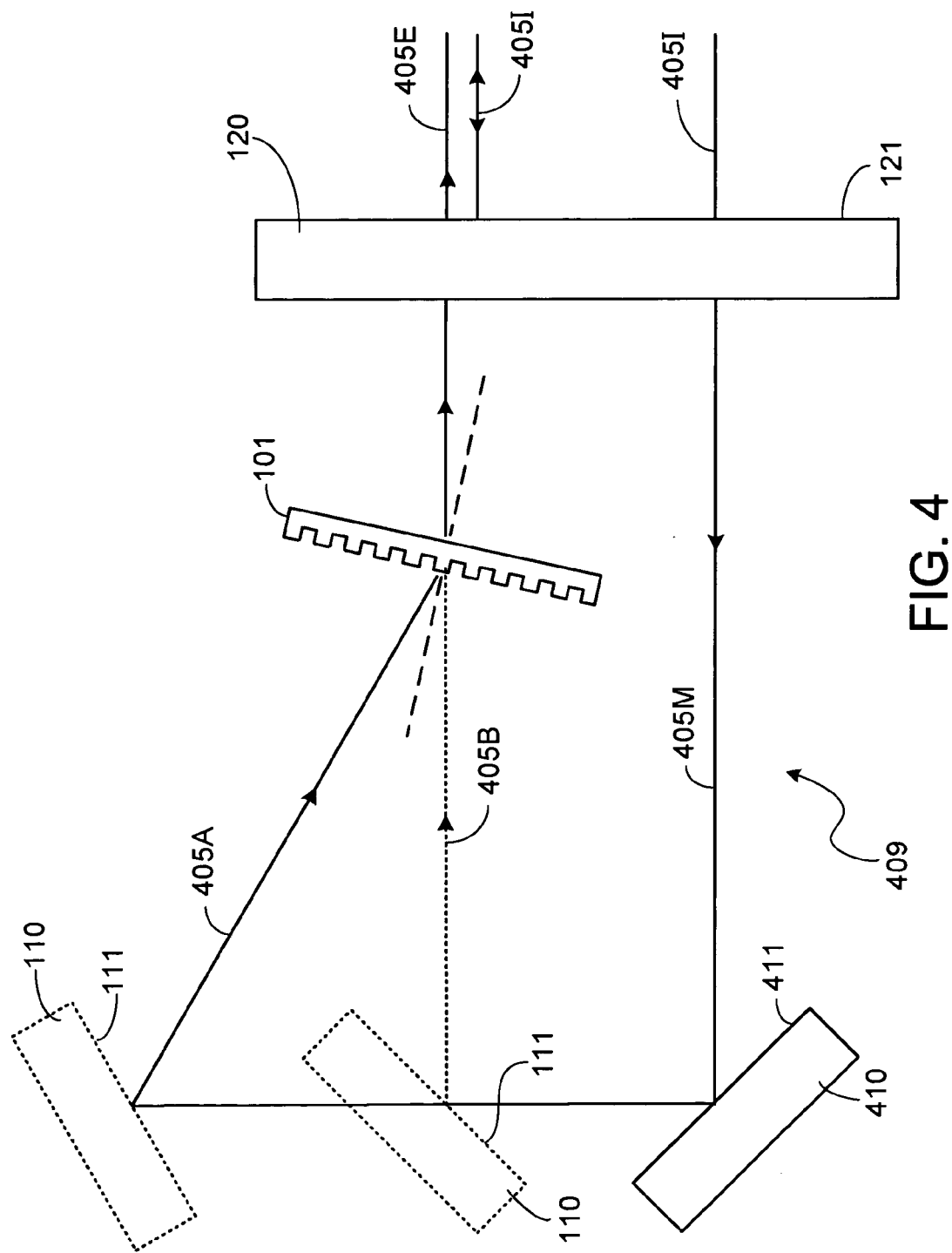
FIG. 4 is a schematic diagram of a Fizeau interferometer in a single-pass configuration for characterizing a transmission grating.

While the embodiment shown in FIG. 2 is configured so the diffracted wavefronts pass through transmission grating 101 twice (i.e., it is a double pass system), interferometry systems can be adapted to characterize transmission grating 101 using a single pass configuration. Referring to FIG. 4, a Fizeau interferometer 409 includes the same components as Fizeau interferometer 109 (see FIG. 2), as well as an additional mirror 410. Like reference mirror 110, mirror 410 is mounted on an adjustable tip/tilt mount (not shown). Transmission grating 101 is positioned with grating lines facing away from transmission flat 120.

An illumination wavefront, indicated by beams 405I, illuminates the entire aperture of interferometer 409, though only a portion of the aperture is used to acquire the interference patterns. A portion of the illumination wavefront is transmitted by transmission flat 120 and reflected by mirror surfaces 411 and 111 to strike grating 101 on the side having the grating lines. This portion is indicated by beam 405M. In a first configuration, mirrors 410 and 110 are adjusted so the minimum deviation condition is satisfied for the first order wavefront. This configuration illuminates transmission grating 101 with beam 405A. In a second configuration, mirror 110 is adjusted so the zeroth order diffracted wavefront overlaps with a reference wavefront reflected by transmission flat 120. This configuration generates beam 405B. The reference wavefront and diffracted wavefronts exiting the interferometer propagate in direction 405E.

This embodiment differs from the embodiment shown in FIG. 3 in that the wavefront is diffracted once by transmission grating 101, rather than twice. This can improve the accuracy of the measurement when measuring strongly chirped gratings by reducing (e.g., eliminating) shearing of the image of the grating, compared to a double-pass configuration.

Figure 5A:
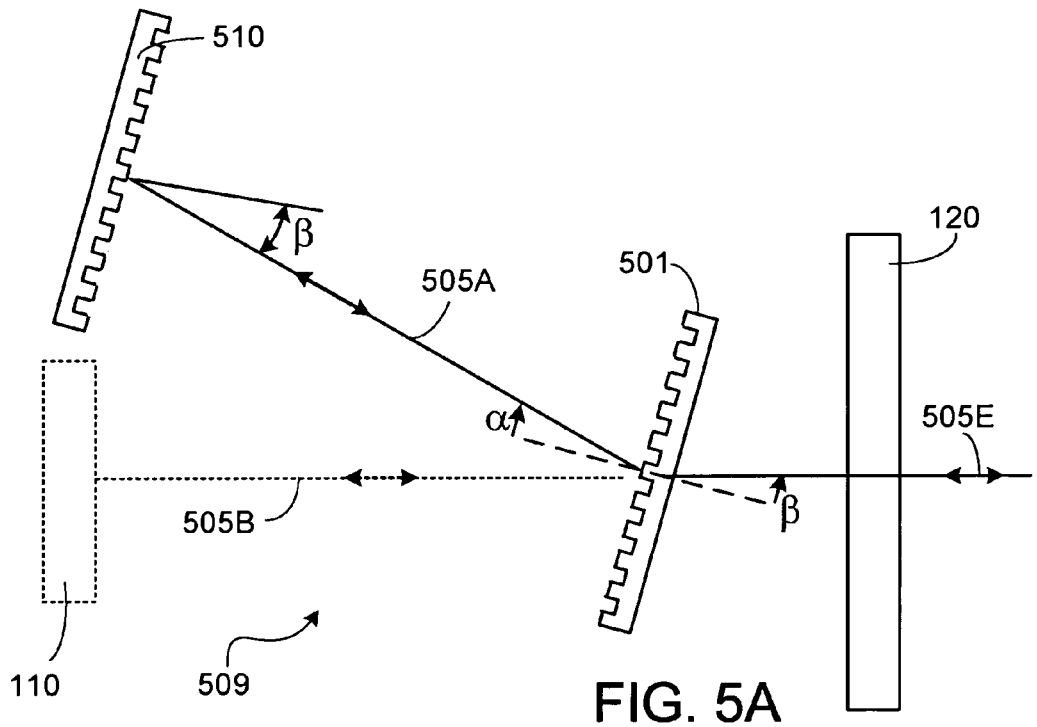
FIG. 5(a) and FIG. 5(b) are schematic diagrams of double-pass Fizeau interferometers configured to characterize strongly chirped transmission.

As previously mentioned, in some embodiments, interferometry systems can be adapted to measure strongly chirped transmission gratings and/or diffractive elements giving rise to highly divergent first order wavefronts. Wavefronts diffracted by strongly chirped transmission gratings can be highly distorted compared to reference wavefront. Much of this distortion should be removed from diffracted wavefront before overlapping diffracted and reference wavefront at the CCD camera in order to accurately measure the diffracted wavefront profile. It is possible to remove such distortions using a compensating or nulling element. Referring to FIG. 5(a), a Fizeau interferometer 509 is used to characterize a strongly chirped transmission grating 501 and includes a strongly chirped master reflection grating 510 as a reference nulling element. Master reflection grating 510 is positioned to retro-reflect a first order wavefront diffracted from transmission grating 501. In other words, master reflection grating is used in the Littrow configuration (beam 505A). Wavefronts diffracted by master grating 510 have essentially twice the negative of the distortion induced in a first order wavefront diffracted by transmission grating 501. In practice, it is not typically necessary that the master grating nulls perfectly the first order wavefront diffracted from transmission grating 501 as long as it removes most of the strong chirp effects so that the wavefront curvature can be accommodated by the interferometer. In addition, the master and transmission gratings do not necessarily have to have the same average period, so long as they create wavefront distortions in the correct ratio.

Interferometer 509 retains reference mirror 110 for reflecting the zeroth order wavefront (beam 505B). Diffracted wavefronts exit interferometer 509 along overlapping a reference wavefront in beam 505E.

Figure 5B:
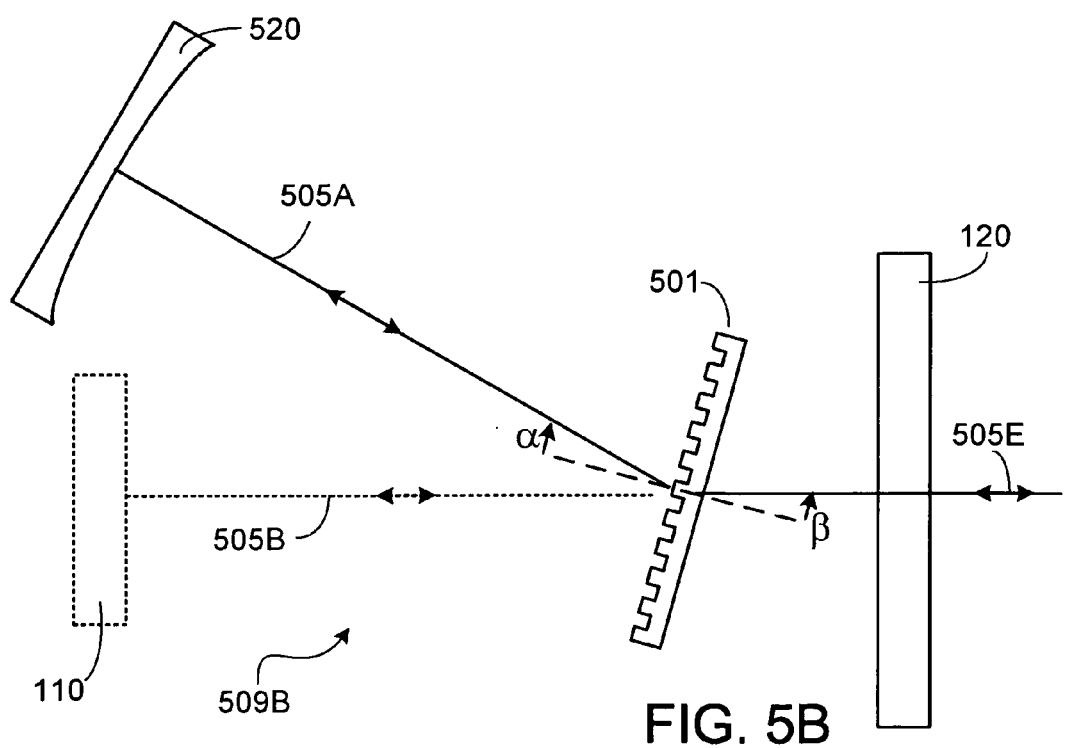

Although the embodiment shown in FIG. 5(a) utilizes a master reflection grating as a nulling element, other optical elements can also be used as nulling elements. For example, in the case of strongly linearly chirped gratings the diffracted wavefront is nearly cylindrical, as would be produced by a cylindrical lens. Hence, a cylindrical reference mirror could also be used in place of a master grating to create the nulling wavefront. Such an interferometer is shown in FIG. 5(b). Interferometer 509B includes a concave mirror 520 as a nulling element instead of master grating 510.

In general, a nulling element should sufficiently compensate for distortion of the first order diffracted wavefront by a grating so a diffracted wavefront exiting the interferometer can be satisfactorily imaged onto the CCD camera. Thus, provided the imaging optics in the interferometry system have a sufficiently high numerical aperture, the nulling element need not perfectly compensate for distortion of the first order wavefront. Accordingly, the methods and systems disclosed herein can be adapted to characterize a wide variety of diffractive elements (e.g., gratings with different chirps and custom holographic optical elements) without necessarily having to provide a custom nulling element for each diffractive element type.

Figure 6:
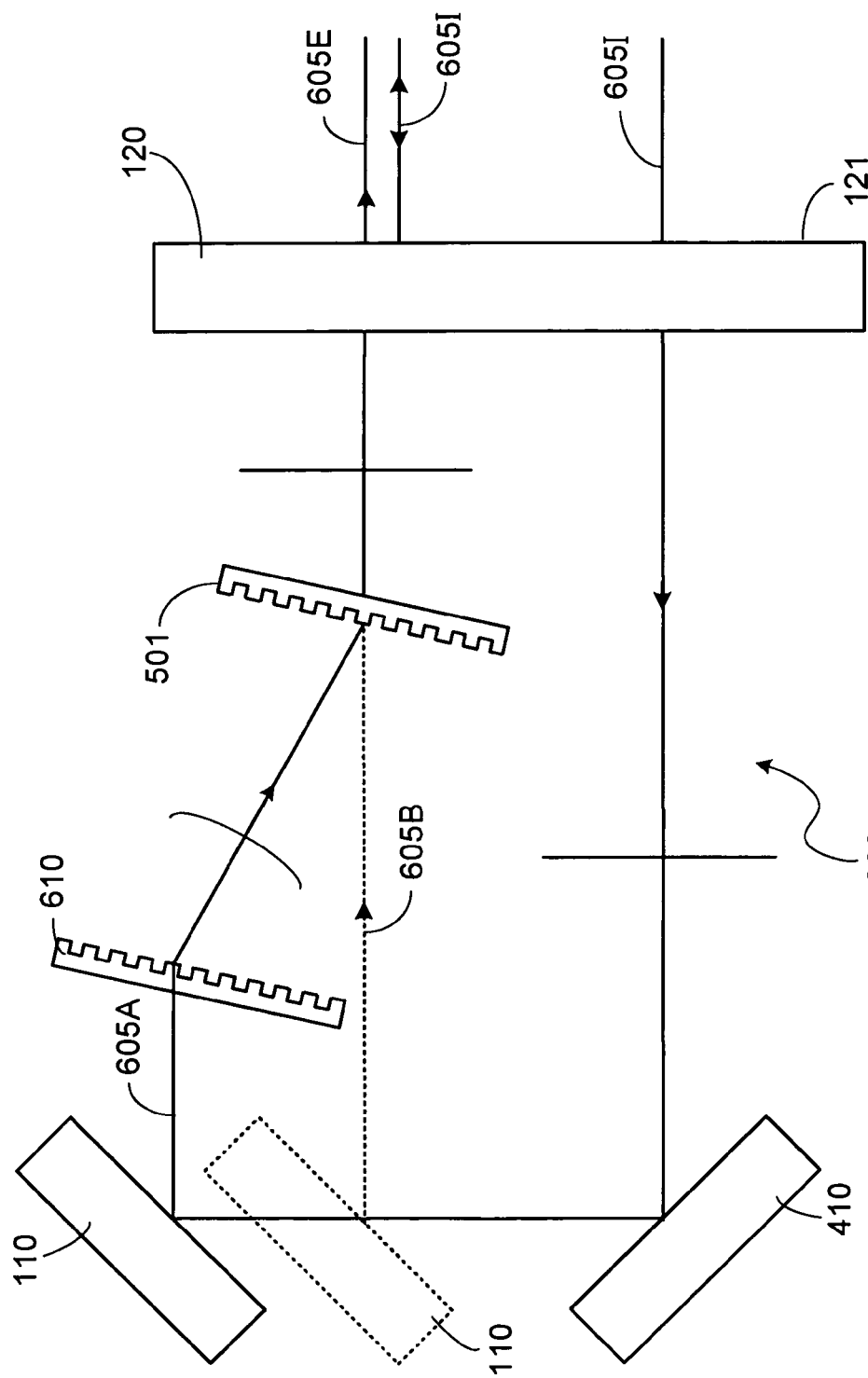
FIG. 6 is a schematic diagram of a single-pass Fizeau interferometer configured to characterize a strongly chirped transmission grating.

Nulling optical elements can also be used in single-pass configurations to characterize strongly chirped transmission gratings. Referring to FIG. 6, an interferometer 609 includes a master transmission grating 610, which is used to create a wavefront that cancels out most of the wavefront distortion introduced by the strong chirp of transmission grating 501. Both gratings are at the minimum deviation condition.

To measure the first order phase map, mirrors 410 and 110 are positioned to direct a wavefront towards master transmission grating 610, which diffracts this wavefront toward transmission grating 501 (beam 605A). Transmission grating 501 diffracts the once diffracted wavefront, which then exits the interferometer overlapping with a reference wavefront in beam 605E.

Master transmission grating 610 introduces wavefront distortion that is essentially the negative of the distortion that is induced by transmission grating 501. Hence, the master grating acts as a null lens. In some embodiments, master transmission grating 610 can be identical to transmission grating 501. Rotating one of the transmission gratings by 180° in its plane effectively creates a master/test grating pair. However, it is not typically required that master transmission grating 610 perfectly nulls the wavefront, provided the master grating removes most of the strong chirp introduced by transmission grating 501 so that the curvature of the exiting wavefront can be accommodated by the imaging optics of the interferometry system.

To measure the zeroth order wavefront phase profile, mirror 110 is repositioned to direct a wavefront propagating directly towards transmission grating 501 (beam 605B), so that a zeroth order wavefront diffracted (i.e., transmitted) from transmission grating 501 exits interferometer 609 overlapping with the reference wavefront in beam 605E. Because of the symmetry of this interferometer arrangement, mirror 110 may only need to be translated to perform the zeroth order wavefront phase profile (as opposed to translated and re-oriented). The master grating may or may not need to be removed for this step.

Optionally, if the nulling element is a master transmission grating, the influence of its substrate can also be eliminated from the wavefront distortion profile by placing the master on the test mount and measuring the master grating in transmission. This third measurement is also subtracted from the from the first order wavefront phase profile.

In the case of strongly linearly chirped gratings the diffracted wavefront can be approximately cylindrical, as would be produced by a cylindrical lens. Hence, a cylindrical lens could also be used in place of master transmission grating 610 to create the nulling wavefront.

Note that in the single pass interferometers described in reference to FIG. 4 and FIG. 6, only a portion of the aperture of the imaging optics is used in each measurement. Such configurations are used to interferometrically characterize retroreflectors (see, e.g., "Optical Shop Testing," edited by Daniel Malacara, pp. 30–34).

Figure 7:
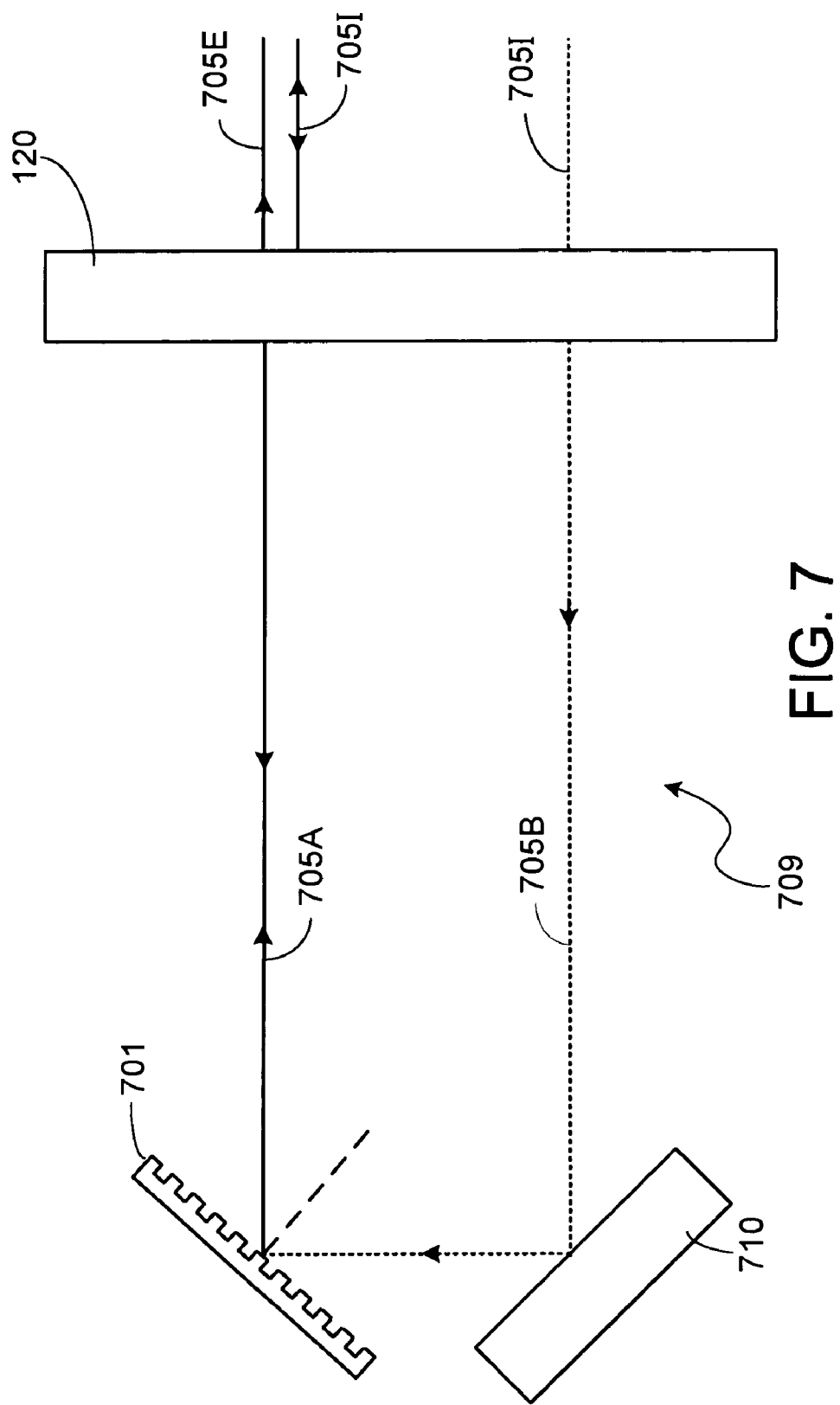
FIG. 7 is schematic diagram of a single-pass Fizeau interferometer configured to characterize a reflection grating.

Referring to FIG. 7, a Fizeau interferometer 709 can also be adapted to characterize a reflection grating 701 in a single-pass configuration. Interferometer 709 includes transmission flat 120 and a mirror 810. Reflection grating 701 and mirror 810 are both mounted on adjustable mounts (not shown). Initially, the user installs reflection grating 701 with grating lines facing the interferometer and perpendicular to an input wavefront, indicated by beam 705I. A portion of the input wavefront is reflected by a surface of transmission flat 120, forming the reference wavefront. The reference wavefront is indicated by beam 705E. Transmission flat 120 transmits measurement wavefronts, which propagates towards grating 701 and mirror 810, indicated by beams 705A and 705B, respectively. The measurement wavefront indicated by beam 705A is incident directly on reflection grating 701, whereas the measurement wavefront indicated by beam 705B is reflected by mirror 710 towards reflection grating 701.

To acquire zeroth and first order phase maps, the user rotates reflection grating 701 until the first order wavefront diffracted by grating 701 in response beam 705A is retro reflected back towards transmission flat 120. In other words, reflection grating 701 is positioned in the Littrow configuration. The first order wavefront exits interferometer 709 overlapping with the reference wavefront in beam 705E. The user orients mirror 710 so that no wavefronts diffracted by reflection grating 701 in response to beam 705B overlap beam 705E. Once in this orientation, the interferometry system acquires the first order phase map.

Next, the user reorients reflection grating 701 so that no wavefronts diffracted by reflection grating 701 in response to beam 705A overlap with beam 705E. The user also reorients mirror 710 to illuminate reflection grating 701 with beam 705B, and reflection grating 701 diffracts a zeroth order wavefront to exit interferometer 709 overlapping beam 705E. In this configuration, the zeroth order wavefront overlaps the reference wavefront at the CCD camera (not shown), and the interferometry system acquires a zeroth order wavefront phase profile.

Alternatively, reflection grating 701 can be reoriented so that the grating normal would be parallel to beam 705A. There is no need for a fold mirror in this case. However, the apparent grating position and size would be different at the camera for the two measurements, making the calculation of the corrected wavefront more difficult. In particular, one wavefront map would have to be "stretched" numerically to match the spatial sampling of the other.

Figure 8:
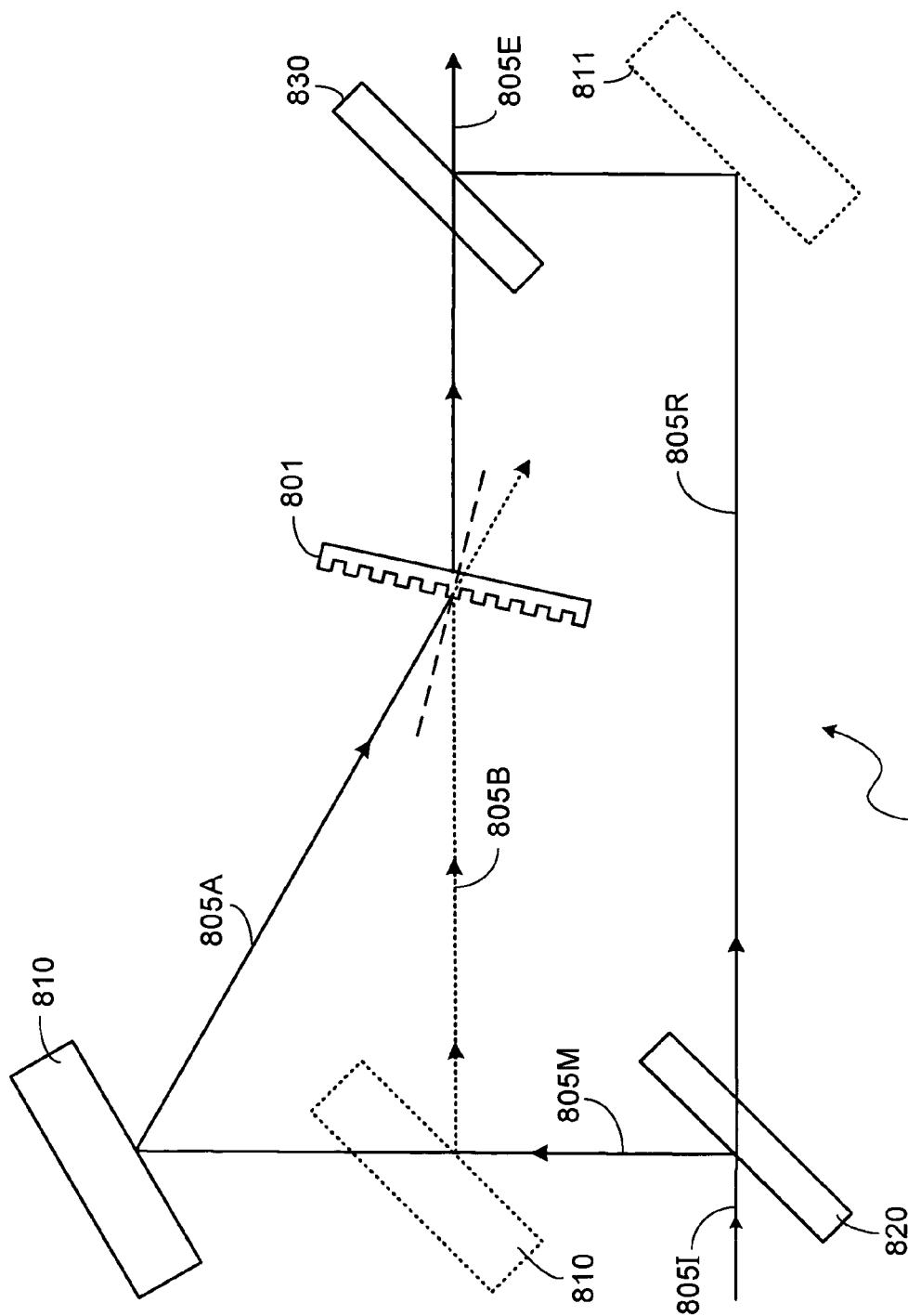
FIG. 8 is a schematic diagram of a Mach-Zehnder interferometer configured to characterize a transmission grating.

While the foregoing embodiments include Fizeau interferometers, other interferometers can also be used to characterize diffractive elements. For example, one can use a Mach-Zehnder interferometer or a Michelson interferometer. Referring to FIG. 8, a Mach-Zehnder interferometer 809 is used to characterize transmission grating 801. Mach-Zehnder interferometer 809 includes beamsplitters 820 and 830 and mirrors 810 and 811. Beamsplitter 820 splits an input wavefront propagating in direction 805I into a measurement wavefront and a reference wavefront and directs the measurement wavefront and reference wavefronts towards mirrors 810 and 811, respectively. The measurement and reference wavefront are indicated by beams 805M and 805R, respectively. Mirror 810 directs the measurement wavefront towards transmission grating 801, which is oriented with its transmission lines facing mirror 810. Transmission grating 801 diffracts the measurement wavefront into multiple diffracted wavefronts. Mirror 810 is mounted on an adjustable mount (not shown), and is adjusted so that one of the diffracted wavefronts is directed towards beamsplitter 830. Mirror 811 directs the reference wavefront towards beamsplitter 830, which overlaps the reference wavefront with the diffracted wavefront and directs the overlapping wavefronts to the interferometry systems imaging optics and CCD camera (not shown).

In order to acquire first order and zeroth order phase maps, the user adjusts mirror 810 between first and second positions. In the first position, mirror 810 illuminates transmission grating 801 with beam 805A. In this configuration, transmission grating 801 diffracts a first order wavefront towards beamsplitter 830, and the interferometry system acquires the first order phase map. In the second position, mirror 810 is positioned to direct beam 805B to transmission grating 701, which diffracts a zeroth order wavefront towards beamsplitter 830. In this configuration, the interferometry system acquires the zeroth order phase map.

When using a Michelson interferometer the reference wavefront is generated within a separated leg of the interferometer. The optical path difference between test and reference wavefront can be brought substantially close to zero, allowing the use of sources that have limited coherence length, compared to the longer coherence length typically used with a Fizeau interferometer.

In any of the embodiments described above, the computer can include hardware, software, or a combination of both to control the other components of the system and to analyze the phase-shifted images to extract the desired information about the measurement object. The analysis described above can be implemented in computer programs using standard programming techniques. Such programs are designed to execute on programmable computers each comprising a processor, a data storage system (including memory and/or storage elements), at least one input device, at least one output device, such as a display or printer. The program code is applied to input data (e.g., phase-shifted images from a CCD camera) to perform the functions described herein and generate information (e.g., the topography of a selected surface), which is applied to one or more output devices. Each computer program can be implemented in a high-level procedural or object-oriented programming language, or an assembly or machine language. Each such computer program can be stored on a computer readable storage medium (e.g., CD ROM or magnetic diskette) that when read by a computer can cause the processor in the computer to perform the analysis described herein.

A number of embodiments of the invention have been described. Nevertheless, it will be understood that various modifications may be made without departing from the spirit and scope of the invention. Accordingly, other embodiments are within the scope of the following claims.

What is claimed is:

1. A method for interferometrically characterizing a diffractive element, comprising:
producing a first phase profile of the diffractive element based on a zeroth order wavefront diffracted from the diffractive element;
producing a second phase profile of the diffractive element based on a non-zero order wavefront diffracted from the diffractive element; and
characterizing the diffractive element based on the first and second phase profiles.

2. The method of claim 1, wherein producing the first phase profile comprises acquiring a first interference pattern derived from the zeroth order wavefront and producing the second phase profile comprises acquiring a second interference pattern derived from the non-zero order wavefront.

3. The method of claim 2, wherein the first interference pattern is derived by interfering a reference wavefront with the zeroth order wavefront and the second interference pattern is derived by interfering the reference wavefront with the non-zero order wavefront.

4. The method of claim 2, wherein the first phase profile is produced based on an interference phase determined for each of a plurality of locations in the first interference pattern and the second phase profile is produced based on an interference phase determined for each of a plurality of locations in the second interference pattern.

5. The method of claim 4, wherein producing the first phase profile further comprises acquiring a first set of interference patterns including the first interference pattern derived from the zeroth order wavefront, and producing the second phase profile further comprises acquiring a second set of interference patterns including the second interference pattern derived from the non-zero order wavefront.

6. The method of claim 5, wherein the first phase profile is produced based on additional interference phases determined from the first set of interference patterns for each of the plurality of locations in the first interference pattern and the second phase profile is produced based on additional interference phases determined from the second set of interference patterns for each of the plurality of locations in the second interference pattern.

7. The method of claim 6, wherein for both sets of interference patterns, the interference phase at each location is shifted with respect to an interference phase at that location in other interference patterns in that set.

8. The method of claim 7, further comprising illuminating the diffractive element with measurement wavefronts to form diffracted wavefronts including the zeroth order wavefront and the non-zero order wavefront.

9. The method of claim 8, further comprising varying a wavelength of the measurement wavefront to shift the interference phase at each location.

10. The method of claim 8, further comprising varying the optical path length between the reference wavefront and diffracted wavefronts to shift the interference phase at each location.

11. The method of claim 2, wherein the first and second interference patterns are produced using a Fizeau interferometer, a Michelson interferometer or a Mach-Zehnder interferometer.

12. The method of claim 1, wherein the diffractive element is a transmissive diffractive element.

13. The method of claim 1, wherein the diffractive element is a reflective diffractive element.

14. The method of claim 1, wherein the diffractive element is a phase mask for writing fiber Bragg gratings.

15. The method of claim 1, wherein the non-zero order wavefront is a first order wavefront diffracted from the diffractive element.

16. The method of claim 1, wherein the diffractive element is positioned relative to illumination optics so that a direction defined by the non-zero order wavefront is minimally displaced from a direction defined by the zeroth order wavefront.

17. The method of claim 1, wherein the diffractive element is oriented in a Littrow configuration with respect to a measurement wavefront.

18. The method of claim 2, wherein the interference patterns are acquired using a single pass system.

19. The method of claim 2, wherein the interference patterns are acquired using a double pass system.

20. The method of claim 1, further comprising reducing distortion of the non-zero order wavefront due to the diffractive element by nulling the non-zero order wavefront.

21. The method of claim 20, wherein nulling the non-zero order wavefront comprises diffracting the non-zero order wavefront from a diffractive nulling element.

22. The method of claim 21, wherein the diffractive nulling element is a master for the diffractive element.

23. The method of claim 20, wherein nulling the non-zero order wavefront comprises reflecting the non-zero order wavefront from a non-planar mirror.

24. The method of claim 1, wherein the diffractive element is characterized by determining variations in a grating period of the diffractive element from the first and second phase maps.

25. The method of claim 24, wherein determining variations in the grating period comprises removing distortions common to the first and second phase maps from the second phase map.

26. The method of claim 25, wherein the distortions are related to inhomogeneities of a surface of the diffractive element.

27. The method of claim 24, wherein the diffractive element is characterized by determining a fit of the wavefront distortion profile to an analytical model.

28. The method of claim 27, wherein the diffractive element is characterized by determining one or more grating parameters from the fit of the wavefront distortion profile to the analytical model.

29. The method of claim 28, wherein the grating parameters include linear chirp or quadratic chirp.

30. A method of making a fiber Bragg grating, comprising:
characterizing a phase mask using the method of claim 1; and
illuminating an optical fiber through the phase mask to form the fiber Bragg grating.

31. The method of claim 25, wherein the distortions are related to inhomogeneities in the composition of the diffractive element.

* * * * *